US010574745B2

(12) United States Patent
Jose Chiriyankandath et al.

(10) Patent No.: US 10,574,745 B2
(45) Date of Patent: Feb. 25, 2020

(54) SYNCING WITH A LOCAL PAIRED DEVICE TO OBTAIN DATA FROM A REMOTE SERVER USING POINT-TO-POINT COMMUNICATION

(71) Applicant: Western Digital Technologies, Inc., Irvine, CA (US)

(72) Inventors: Cipson Jose Chiriyankandath, Santa Clara, CA (US); Michael Dougherty, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 434 days.

(21) Appl. No.: 14/674,681

(22) Filed: Mar. 31, 2015

(65) Prior Publication Data

US 2016/0294938 A1 Oct. 6, 2016

(51) Int. Cl.
*H04L 29/08* (2006.01)
*H04L 12/24* (2006.01)
(Continued)

(52) U.S. Cl.
CPC ........ *H04L 67/1074* (2013.01); *G06F 16/166* (2019.01); *G06F 16/178* (2019.01);
(Continued)

(58) Field of Classification Search
CPC ............. H04L 67/1074; H04L 12/2854; H04L 61/2038; H04L 67/1097; H04L 67/1091; H04L 67/2814; H04L 41/0806; H04L 41/0886; H04L 41/5054; H04L 41/0859; H04L 41/08; H04L 67/125; H04L 41/0813; H04W 4/008; H04W 4/001; G06F 3/065; G06F 17/30194; G06F 17/3007;
(Continued)

(56) References Cited

U.S. PATENT DOCUMENTS 6,073,220 A 6/2000 Gunderson
6,499,054 B1 12/2002 Hesselink et al.
(Continued)

OTHER PUBLICATIONS

McDonough, Andy, "How to Build Standalone NAS Systems," Oct. 31, 2005, http://www.crn.com/recipes/channel-programs/172901595/how-to-build-standalone-nas-systems.htm.*
(Continued)

*Primary Examiner* — Ranodhi Serrao

(57) ABSTRACT

A computer-implemented method may comprise requesting, by a first mobile computing device, a logical data object stored at an address location on a wide area network (WAN); receiving, by the first mobile computing device, the requested logical data object from the address location on the WAN and storing the received logical data object in the first mobile computing device. A logical data object request may then be received from a second mobile computing device. Responsive to the logical data object request, a copy of the stored logical data object of the logical data object stored at the address location on the WAN may be sent from the first mobile computing device to the second mobile computing device using a peer-to-peer communication protocol. The sent copy of the stored logical data object may be devoid of data or data files referred to by the stored logical data object.

20 Claims, 3 Drawing Sheets

(51) Int. Cl.
*G06F 16/27* (2019.01)
*G06F 16/16* (2019.01)
*G06F 16/178* (2019.01)
*G06F 16/182* (2019.01)
*G06F 16/21* (2019.01)
*H04L 12/28* (2006.01)
*H04L 29/12* (2006.01)
*H04W 4/80* (2018.01)

(52) U.S. Cl.
CPC .......... *G06F 16/183* (2019.01); *G06F 16/214* (2019.01); *G06F 16/27* (2019.01); *H04L 12/2854* (2013.01); *H04L 41/0859* (2013.01); *H04L 41/5054* (2013.01); *H04L 61/2038* (2013.01); *H04L 67/1097* (2013.01); *H04W 4/80* (2018.02)

(58) Field of Classification Search
CPC ............. G06F 17/301; G06F 17/30106; G06F 17/30174; G06F 17/30212; G06F 17/30268; G06F 17/30377; G06F 17/30203; G06F 17/30123; G06F 17/30575; G06F 17/30197; G06F 17/303; G06F 17/30923; G06F 17/30607; G06F 11/1446; G06F 2201/84; G06F 17/2288; G06F 8/71
See application file for complete search history.

(56) References Cited

U.S. PATENT DOCUMENTS

| | | |
|---|---|---|
| 6,732,158 B1 | 5/2004 | Hesselink et al. |
| 7,100,077 B2 | 8/2006 | Saika |
| 7,120,692 B2 | 10/2006 | Hesselink et al. |
| 7,228,438 B2 | 6/2007 | Bushmitch et al. |
| 7,302,579 B1 | 11/2007 | Cain et al. |
| 7,404,051 B2 | 7/2008 | Shitomi |
| 7,421,078 B2 | 9/2008 | Akiyama |
| 7,454,443 B2 | 11/2008 | Ram et al. |
| 7,467,187 B2 | 12/2008 | Hesselink et al. |
| 7,502,931 B2 | 3/2009 | Theimer |
| 7,529,785 B1 | 5/2009 | Spertus et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,694,089 B2 | 4/2010 | Furuhashi et al. |
| 7,788,404 B2 | 8/2010 | Hesselink et al. |
| 7,802,131 B2 | 9/2010 | Watanabe et al. |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,032,702 B2 | 10/2011 | Grimes et al. |
| 8,171,337 B2 | 5/2012 | Peters et al. |
| 8,224,248 B2 | 7/2012 | Demirbasa et al. |
| 8,225,109 B1 | 7/2012 | Kalligudd |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 8,856,293 B1 | 10/2014 | Sadry |
| 8,930,306 B1* | 1/2015 | Ngo ................. G06F 17/30194 707/610 |
| 9,009,525 B1 | 4/2015 | Murphy et al. |
| 9,569,459 B1* | 2/2017 | Strauss ............. G06F 17/30194 |
| 2001/0034733 A1 | 10/2001 | Prompt et al. |
| 2003/0051135 A1 | 3/2003 | Gill et al. |
| 2004/0010732 A1 | 1/2004 | Oka |
| 2004/0136224 A1 | 7/2004 | Hamer et al. |
| 2005/0144195 A1 | 6/2005 | Hesselink et al. |
| 2005/0144200 A1 | 6/2005 | Hesselink et al. |
| 2007/0106771 A1* | 5/2007 | Lucash ................ H04L 67/1095 709/223 |
| 2008/0126446 A1 | 5/2008 | Brunet et al. |
| 2008/0250215 A1 | 10/2008 | Shitomi |
| 2008/0313085 A1 | 12/2008 | Kravitz et al. |
| 2009/0097459 A1 | 4/2009 | Jendbro et al. |
| 2009/0228509 A1* | 9/2009 | McCarthy ........ G06F 17/30165 |
| 2009/0240728 A1* | 9/2009 | Shukla ............. G06F 17/30607 |
| 2010/0037051 A1 | 2/2010 | Chang et al. |
| 2010/0058054 A1 | 3/2010 | Irvine |
| 2010/0293148 A1* | 11/2010 | Cesario .............. G06F 11/1451 707/652 |
| 2010/0299518 A1 | 11/2010 | Viswanathan et al. |
| 2012/0036041 A1 | 2/2012 | Hesselink |
| 2012/0117555 A1 | 5/2012 | Banerjee et al. |
| 2012/0246511 A1 | 9/2012 | Sato |
| 2012/0330887 A1* | 12/2012 | Young .............. G06F 17/30017 707/610 |
| 2013/0174273 A1* | 7/2013 | Grab ....................... G06F 21/10 726/28 |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0047516 A1 | 2/2014 | Deshpande |
| 2014/0095439 A1 | 4/2014 | Ram |
| 2014/0122658 A1* | 5/2014 | Haeger ............... H04L 29/0854 709/219 |
| 2014/0129652 A1 | 5/2014 | Chan et al. |
| 2014/0169921 A1 | 6/2014 | Carey |
| 2014/0173022 A1* | 6/2014 | Morrison, III ...... H04L 67/1063 709/217 |
| 2014/0173027 A1* | 6/2014 | Kappes ............... H04L 67/1097 709/217 |
| 2014/0173215 A1 | 6/2014 | Lin et al. |
| 2014/0274084 A1* | 9/2014 | Ross .................. H04L 67/2842 455/450 |
| 2015/0142934 A1* | 5/2015 | Craine ............... H04L 41/0806 709/221 |
| 2015/0249618 A1* | 9/2015 | Golander .......... G06F 17/30312 709/224 |
| 2015/0358297 A1* | 12/2015 | Endahl ................ H04L 63/0435 713/168 |
| 2016/0072804 A1* | 3/2016 | Chien .................... H04L 63/10 726/4 |
| 2016/0094649 A1* | 3/2016 | Dornquast .......... H04L 67/1072 709/227 |
| 2016/0147616 A1* | 5/2016 | Schefe ................ G06F 11/1469 707/684 |
| 2016/0241441 A1* | 8/2016 | Jiang ....................... H04L 67/42 |
| 2017/0013046 A1* | 1/2017 | Flynn ...................... H04L 67/06 |

OTHER PUBLICATIONS

Gonzalez, Barb, "How to Stream Media Over Your Home Network," Jun. 18, 2012, http://www.soundandvision.com/content/how-stream-media-over-your-home-network#yCpKR4eATWXI06Pd.97.*
International Search Report and Written Opinion dated Jul. 7, 2016 in related PCT Application No. PCT/US2016/024214.
Resetting to Factory Defaults by Steuys published by ReadyNAS.com Jan. 1, 2012 http://www.readynas.com/forum/viewtopic.php?f=65&t=59899.
"READYNAS Instant Storage Using Rsync for NAS-to-NAS Backups", Infrant Technologies, 21 pages.

(56) References Cited

OTHER PUBLICATIONS

"READYNAS Instant Storage Using Rsync for NAS-to-NAS Backups", Infrant Technologies, downloaded from a Nov. 17, 2011 archive made by the Internet Archive, located at https://web.archive.org/web/20111117141509/http://www.readynas.com/downlo- ad/documentation/support/rsync.sub.--howto.sub.--nastonas.pdf, 21 pages.

* cited by examiner

SYNCING WITH A LOCAL PAIRED DEVICE TO OBTAIN DATA FROM A REMOTE SERVER USING POINT-TO-POINT COMMUNICATION

BACKGROUND

Downloading the contents and/or structure of a database or other logical data object to a tablet, phone or other mobile computing device from a remote server over a wide area network (WAN) can be a lengthy and bandwidth-intensive task. Moreover, there are times in which it may be desired to transfer or replicate data from one device to another device. However, downloading permissions, authentication information, schema and data from a remote server over a WAN can be burdensome, in terms of computational resources, time and bandwidth.

DETAILED DESCRIPTION

Figure 1:
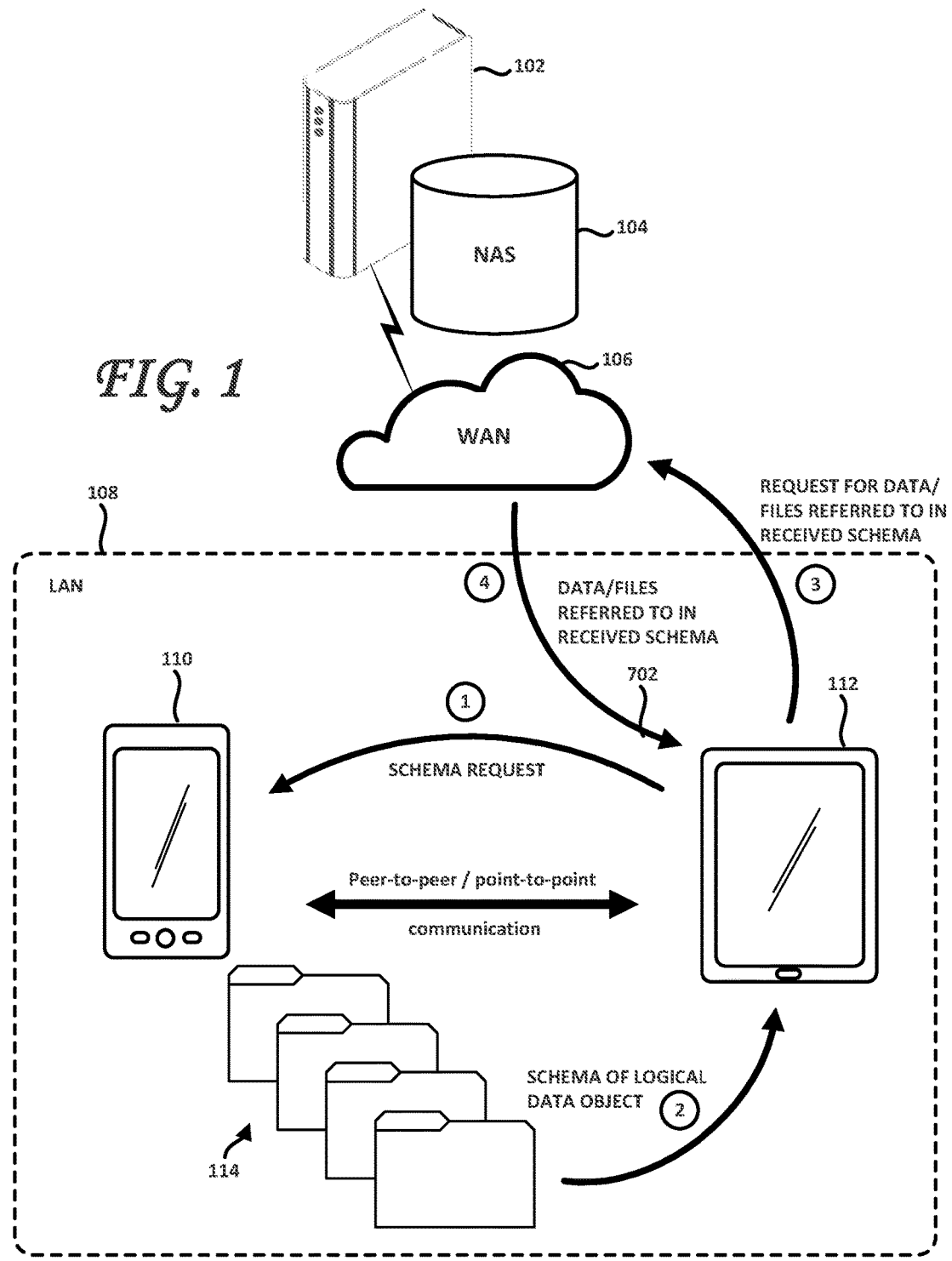
FIG. 1 is a block diagram of a method, devices and systems according to one embodiment.

FIG. 1 is a block diagram of a method, devices and systems according to one embodiment. As shown therein, reference numeral 102 denotes a data storage device coupled to a WAN 106 including, for example, the Internet. The data storage device 102 may comprise, for example, a network attached storage (NAS), a storage area network (SAN), a server or other computing device at an address location on the WAN 106. The data storage device 102 may store, for example, a database 104, a configuration file, an XML file or any other logical data structure. For example, the database may comprise a collection of pictures and videos of a user of a mobile computing device or may comprise, for example, a Customer Relationship Management (CRM) database, in the case in which an embodiment is deployed in the enterprise arena. Herein, for brevity and simplicity's sake, reference will be made below to a "database" as an exemplary logical data structure, it being understood that the term "database" is expressly intended herein to encompass any form of such logical data structures. A mobile or other computing device 110 may be coupled to a local area network (LAN) 108, as may be mobile or other computing device 112. Mobile computing devices 110, 112 may be coupled to the LAN 108 as well as to the WAN 106.

According to one embodiment, one of the mobile computing devices, such as mobile computing device 110, may store a complete copy of the database 104, a partial copy thereof or may only store the schema of the database 104. The schema of the database 104 stored by the mobile computing device 110, for example, may include the logical organization (e.g., file structure) of the database 104, as well as references (e.g., fully qualified paths) to the data, files and other logical data constructs stored in the database 104. There may be instances in which a second mobile computing device, such as shown at 112 in FIG. 1, wishes to obtain or access the database 104. Such may be the case when mobile computing device 112 is a new mobile computing device or is newly issued to the user. Such may also be the case when mobile computing device simply has not previously accessed the database 104.

One embodiment enables a peer-to-peer, point-to-point or otherwise direct transfer of database or other logical data structure from a first mobile computing device such as mobile computing device 110 to a second mobile such as mobile computing device 112 within the LAN 108. Indeed, after proper authentication and/or permissions (if any) are established, such a transfer may be carried out over the LAN 108, at LAN speeds or may be carried out using a peer-to-peer, point-to-point or other fast communication protocol. Herein, it is assumed that data transfers may be carried out faster between mobile devices 110 and 112 and with less latency than is typical over the WAN 106.

According to one embodiment, the mobile computing devices 110, 112 may be paired, so as to establish authentication, trust and/or permission and data such as a database schema may be carried out from one of the mobile computing device 110, 112 to the other of the mobile computing devices 112 using a peer-to-peer communication protocol, without involvement of a device outside of the LAN 108. According to one embodiment, such peer-to-peer communication may be effectuated or facilitated by any of a number of, for example, short distance data transfer protocols, such as Bluetooth, Near Field Communication (NFC) and the like. According to one embodiment, the database schema that is transferred between the mobile computing devices 110, 112 may only comprise the schema itself; namely the logical structure of the database and references to the files or other data structures contained therein, to the exclusion of the database data or database files themselves. Thereafter, when the user of the mobile computing device having received the database schema, shown at 114 in FIG. 1, wishes to access the data referred to by the just-received database schema 114, access thereto may be requested and obtained from the mobile computing device from which it received the database schema, if this mobile computing device has the data, is still present and accessible within the same LAN 108 or is still coupled to the requesting computing device using the peer-to-peer communication protocol. Alternatively, access the data referred to by the just-received database schema 114 may be requested and obtained from a remote location on the WAN 106, such as from NAS 102.

According to one embodiment, a mobile computing device such as shown at 110 in FIG. 1 may request, over its network interface, logical data object from an address location on the WAN 106. According to one embodiment, the logical data object may comprise a schema such as, for example, a schema of a database. For example, mobile computing device 110 may request a selected database or other schema from a NAS 102 on the WAN 106. The NAS 102 may then transfer, and the mobile computing device 110 may receive, the requested schema. The received schema may then be stored by and within the mobile device 110. Full or partial contents of the database 104 may also be requested, transferred to and stored by the mobile computing device 110. The database schema received and stored by the mobile computing device 110 may also comprise the address of the NAS 102 and references (e.g., paths and/or pointers) to the data, files or other logical data constructs stored or referred to by the database 104. For example, the schema of database 104 may be transferred upon request to the mobile computing device 110, whereupon the data, files and other logical data constructs contained or referred to by the database 104 may thereafter be transferred to the mobile computing device 110 in the background or on demand.

Herein, reference is made to "schema", although it is to be understood that the term may be replaced by the more generic phrase "logical data object". Also, repeated reference is made herein to "mobile" computing devices. However, it is to be understood that embodiments may be implemented with most any computing devices, whether mobile or not.

Another mobile computing device, say mobile computing device 112 on LAN 108, may desire to access the database 104. Mobile computing device 110 could request and gain access to the database 104, provided sufficient credentials are presented, by accessing the NAS 102 over the WAN 106. Such request and access may, however, be quite slow, as being carried out over a potentially slow, unreliable public network. However, rather than accessing the database 104 over the WAN 106, according to one embodiment, mobile computing device 112 may, as shown at (1) in FIG. 1, send a message to mobile computing device 110, requesting the schema of the database 104 from it, instead of from the NAS 102. Such a schema request may be made to the mobile computing device 110 upon discovery thereof on the LAN 108, upon pairing therewith in a peer-to-peer manner through the mutual exchange of authentication, trust and permission information and upon determining that the mobile computing device 110, in fact, stores a copy of the database schema. Any of a number of discovery protocols may be employed to determine the presence of an eligible mobile computing device on the LAN 108 from which the database schema may be requested. Examples of such discovery protocols include Bluetooth Service Discovery Protocol (SDP), DNS Service Discovery (DNS-SD), Dynamic Host Configuration Protocol (DHCP), Internet Storage Name Service (iSNS), Jini for Java objects, Service Location Protocol (SLP); Session Announcement Protocol (SAP) used to discover RTP sessions; Simple Service Discovery Protocol (SSDP) a component of Universal Plug and Play (UPnP); Universal Description Discovery and Integration (UDDI) for web services; Web Proxy Autodiscovery Protocol (WPAD); WS-Discovery (Web Services Dynamic Discovery); XMPP Service Discovery (XEP-0030) or \XRDS (eXtensible Resource Descriptor Sequence), to name but a few possibilities.

Responsive to the schema request from mobile computing device 112, mobile computing device 110 may retrieve the requested schema from its local storage and may send a copy thereof to requesting mobile computing device 112, as suggested at (2) in FIG. 1. This schema may be transferred from mobile computing device 110 to mobile computing device 112 using peer-to-peer communications, at speeds characteristic of point-to-point communications, which may be higher than communications over the WAN 106. The mobile computing device 112, having received the requested database schema 114 from mobile communication device 110, may store the received schema in its memory or in a local, readily-accessible memory.

At this stage, according to one embodiment, mobile computing device 112 stores a copy of the schema of the database 104. Therefore, mobile computing device 112 has full access to the structure of the database 104, but not to the data contained or referred to therein. For example, mobile device 112 does not yet store any of the files or other data contained or referred to by the received schema of database 104. According to one embodiment, mobile computing device 112 may then request one or more selected files or other logical data constructs referred to in the schema from mobile device 110, if mobile device 110 is still in peer-to-peer communication with mobile device 112 or otherwise accessible to the mobile computing device 112, such as over LAN 108. If mobile computing device 110 is indeed still I peer-to-peer communication with the mobile computing device 112 or can re-establish such communication, it may respond to such request and provide the requested file, data or other logical data structure to the mobile computing device 112, provided that mobile computing device 110 actually stores the requested data, file(s) or other logical data structure(s). Such transfer of data from mobile computing device 110 to mobile device 112 may be effectuated using a peer-to-peer communication protocol, and may take place entirely within LAN 108.

If, however, mobile device 110 is no longer reachable on the LAN 108 or, in fact, does not store a local copy of the requested data, file(s) or other logical data structure(s), mobile computing device 112 may request the same from remote computing device 102, over the WAN 106. This request is shown in FIG. 1 at (3). The remote computing device 102 (a NAS in the example being developed herewith) may then access the requested data, file(s) and/or other logical data structure stored in database 104 and provide the same to mobile computing device 112, as shown at (4) in FIG. 1, provided that mobile computing device possesses the requisite permissions and/or other credentials to access such data. The data so received from the NAS 102 may then be stored in accordance with the schema in a memory local or accessible to mobile computing device 112.

According to one embodiment, the schema provided to mobile computing device 112 by mobile computing device 110 may be periodically updated. Such an update may originate from the NAS 102 when the mobile computing device 112 connects thereto over the WAN 106. However, according to one embodiment, the schema stored by mobile device 112 may be updated by another mobile computing device in communication therewith. For example, the schema stored in mobile computing device 112 may be updated by mobile computing device 110 if the schema stored by mobile computing device 110 is more recent than the schema stored by mobile computing device 112. Alternatively, the schema stored in mobile computing device 110 may be updated by mobile computing device 112 if the schema stored by mobile computing device 112 is more recent than the schema stored by mobile computing device 110, thereby reversing the schema and data provider and the schema and data requester roles previously established. This updating may be carried out asynchronously or at scheduled, regular intervals. In this manner, the schema stored by mobile computing device 112 may be kept synchronized with the schema stored by NAS 102 and/or the schema stored by mobile computing device 110. A publish-subscribe model may be implemented to disseminate changes to selected computing devices within the LAN or coupled to the WAN 106. Alternatively, changes may be propagated when a point-to-point connection between mobile computing devices is established. Other messaging schemes may be implemented.

There may be instances in which the computational horsepower or accessible bandwidth of one computing device far eclipses that of another computing device. In that case, the more capable mobile computing device may, after conferring exchanging suitable information with the other mobile computing device, take on the responsibility of requesting an updated schema and/or data from the (for example) NAS 102 over the WAN. Having obtained such updated schema and/or data, the more capable mobile computing device may then transfer the obtained schema and/or data to its comparatively less capable conferee, using peer-to-peer communication.

To determine which of two schemas is the newest, when a schema is requested or sent from one mobile computing device to another on the LAN 108, schema request and/or the schema itself may comprise a timestamp, which indicates when the schema was last modified. For example, when a copy of a schema is requested from another mobile computing device, the recipient of the request may not send the requested schema if its own copy of the schema is older than the copy thereof on the requesting mobile computing device. Similarly, if a mobile computing device is sent (whether requested or not) a schema, it may not replace its currently-stored schema with the just-received copy thereof if the timestamp of the received schema is older than the timestamp of the schema it has stored locally.

According to one embodiment, the second mobile computing device 112 may send, and the mobile computing device 110 may receive access rights along the schema request. The access rights may comprise authentication information, trust information, authority information and/or any other information or credentials that are effective to define the rights of the schema requestor. Responsive thereto, the recipient of the access rights and schema request may send only that portion of the schema that is compatible with the access rights received. That may be the entire schema, a portion thereof or no part of the schema.

Figure 2:
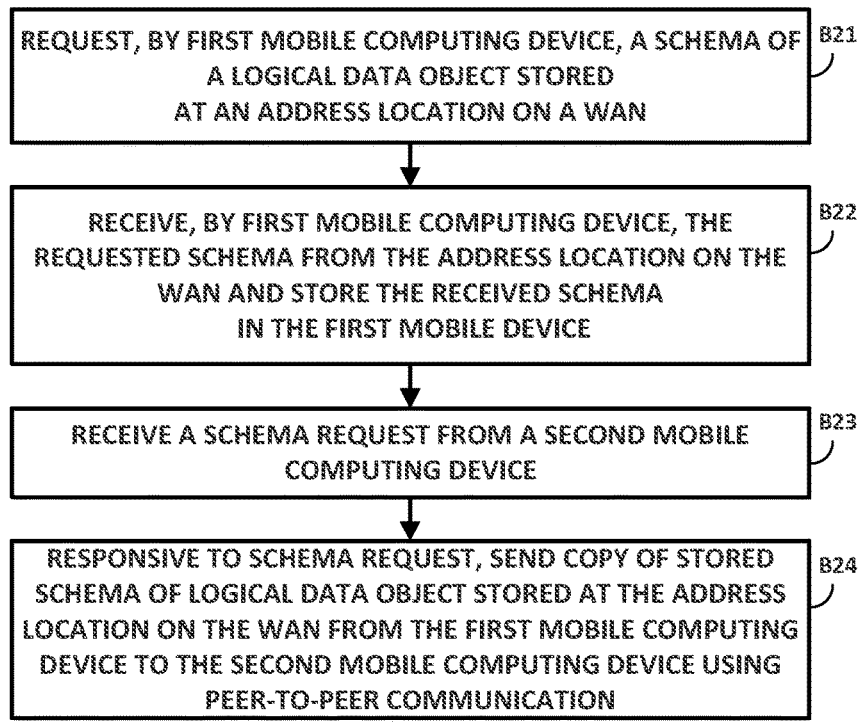
FIG. 2 is a flowchart of a method according to one embodiment.
Figure 3:
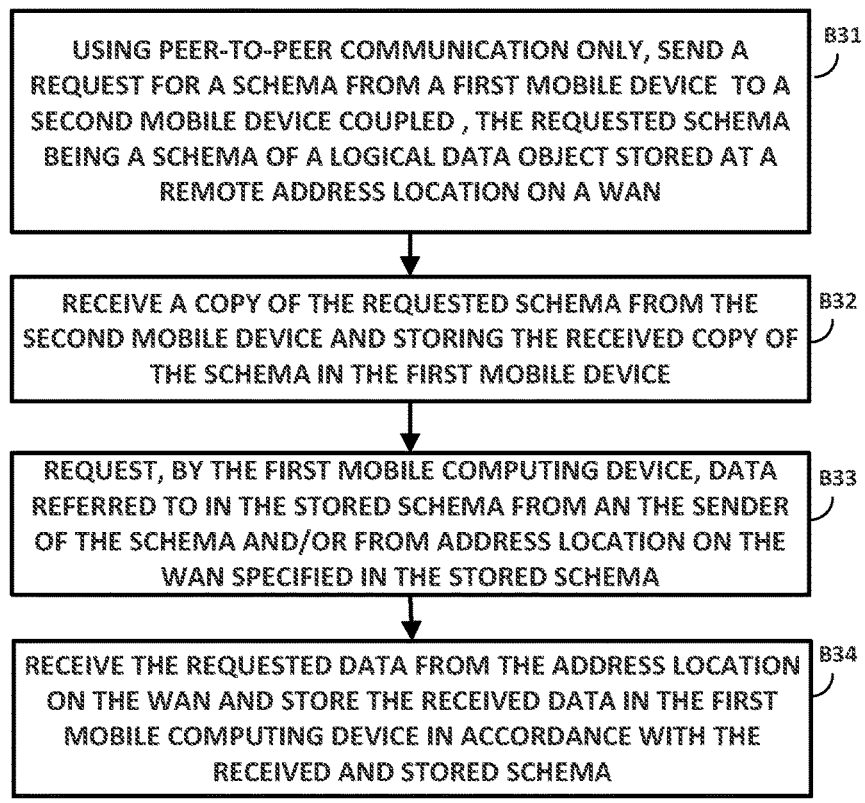
FIG. 3 is a flowchart of a method according to one embodiment.

FIG. 2 is a flowchart of a method according to one embodiment. As shown therein, block B21 calls for requesting, by a first mobile computing device (such as 110 in FIG. 1), a schema 114 of a logical data object (database, files, XML objects, etc.) stored at an address location, such as the address of the NAS 102 on a WAN 106. The mobile computing device 110 may then receive the requested schema from the address location on the WAN 106 and may store the received schema in the first mobile computing device 110, as shown at B22 in FIG. 2. The first mobile computing device 110, as shown at B23, may then receive a schema request from a second mobile computing device, such as mobile computing device 112 in FIG. 1. Thereafter, responsive to the schema request, the first mobile computing device 110, as shown at B24, may then send a copy of the stored schema of the logical data object stored at the address location on the WAN from the first mobile computing device 110 to the second mobile computing device 112 using peer-to-peer or other point-to-point communication. According to one embodiment, the copy of the stored schema sent to the second mobile computing device 112 is devoid of (i.e., does not comprise) data or data files referred to by the stored schema. According to one embodiment, the copy of the stored schema sent to the second mobile computing device 112 may contain some or all of the data referred to by the stored schema Whereas FIG. 2 shows aspects of a method according to one embodiment, from the point of view of a recipient of a schema request, FIG. 3 shows aspects of a computer-implemented method according to one embodiment, from the point of view of a mobile computing device making the schema request and receiving the requested schema. Block B31 calls for using peer-to-peer or other point-to-point communication, sending a request for a schema from a first mobile computing device such as 112 in FIG. 1, to a second mobile computing device such as shown at 110 in FIG. 1. The requested schema, according to one embodiment, may be or comprise a schema of a logical data object stored (e.g., database or other data construct) at a remote address location on a wide area network (WAN). As shown at B32, the mobile computing device 112 may then receive a copy of the requested schema from the second mobile computing device 110 using a peer-to-peer communication method and may then store the received copy of the schema in the first mobile computing device 112 or in a location accessible to the first mobile computing device 112. According to one embodiment, after having received the copy of the schema from the second mobile computing device 110, the first mobile computing device 112 may then request data referred to in the stored schema either from the first mobile device 110 (the sender of the schema) or from an address location on the WAN specified in the stored schema, as shown at B33. Block B33 may be carried out immediately after block B32 or long thereafter, when one or more files or other data constructs referred to by the schema are required. Block B34 then calls for receiving the requested data from the mobile computing device 110 or the address location on the WAN (e.g., a NAS or other server on the WAN) and storing the received data in the first mobile computing device in accordance with the received and stored schema (e.g., in an appropriate place within the file structure defined by the received schema). The received and stored schema, according to one embodiment, may be devoid of data or data files referred to by the received schema.

In another illustrative implementation, some organizations have many computing devices that are coupled to LAN having a single shared WAN connection such as, for example, libraries or schools. It is not uncommon for such a shared WAN connection to be sub-par (low bandwidth), as is common in rural areas or other areas of the world. In such an environment, a user of one of the computing devices on the LAN may access a search engine homepage. Responsive thereto, the search server may download many files (images, stylesheets, javascript files and the like) to the user's computing device. These downloaded files, however, are the same for all users of this search engine. Rather than each computing device requesting the same files from the search engine server over the WAN, these files may be requested from the single computing device within the LAN. The single computing device from which the files were requested may then serve up these files on demand to the requesting computing devices utilizing intra-LAN communication or a peer-to-peer communication channel. In this manner, rather than each computing device requesting the same files from the slow WAN connection, these devices may, instead requested them from a local computing device utilizing the LAN or a peer-to-peer communication channel to fetch the data instead of using up the limited bandwidth on the WAN connection.

As another example, a first computing device may check the weather forecast. Another nearby second computing device may also check the same weather forecast. However, rather than requesting the same data from the weather forecast server, such weather data may be requested from the first computing device who already has the desired forecast stored. In this manner, the weather forecast server endpoint need not again be accessed by the second another computing device that is nearby the first computing device. Other implementations and applications may occur to those of skill in this art.

Figure 4:
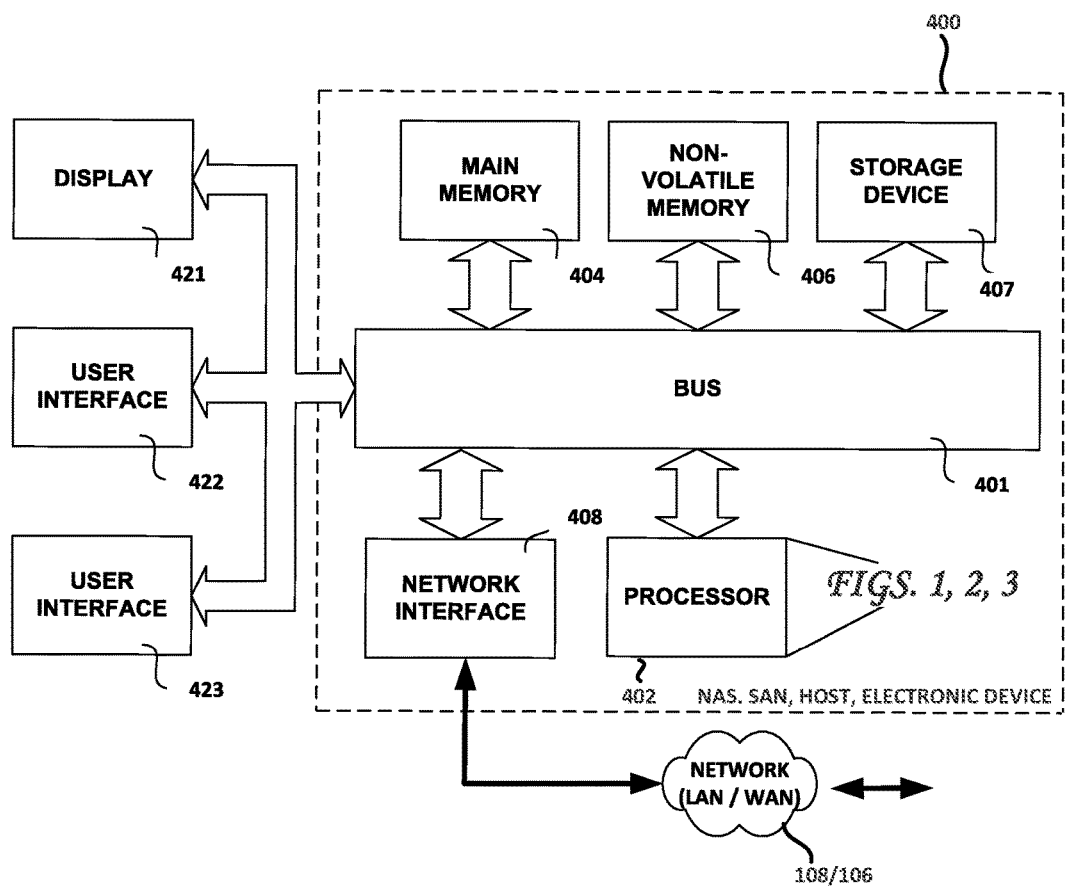
FIG. 4 is a block diagram of a device configured according to one embodiment.

FIG. 4 illustrates a block diagram of a computing device 400 with which an embodiment may be implemented. Computing device 400 may comprise, for example, a NAS, a SAN, a host, server and/or other electronic devices. Computing device 400 may comprise a bus 401 or other communication mechanism for communicating information, and a processor 402 coupled with bus 401 for processing information. The processor may be configured to carry out the functionality shown and described relative to FIGS. 1, 2 and 3. Computing device 400 may further comprise a random access memory (RAM) 404 or other dynamic storage device 404 (referred to as main memory), coupled to bus 401 for storing information and instructions to be executed by processor 402. Main memory 404 also may be used for storing temporary variables or other intermediate information during execution of instructions by processor 402. Computing device 400 may also comprise a read only memory (ROM) and/or other static storage device 406 coupled to bus 401 for storing static information and instructions for processor 402. A data storage device 407, such as a magnetic, solid state and/or optical disk, may be coupled to bus 401 for storing information and instructions. A network interface device 408, such as a modem or network (such as Ethernet, for example) card may also be coupled to the bus 401 to provide access to a network, such as shown at 106 and 108 n FIG. 1.

The computing device 400 may also be coupled via bus 401 to a display device 421 for displaying information to a computer user. Other user interface mechanisms may be provided, as shown at 422 and 423 for communicating direction information and command selections to processor 402. One embodiment is related to the use of a computing device 400 configured for providing and/or receiving a schema object over a LAN, as shown and as described herein. According to one embodiment, the processing described herein may be carried out by one or more computing devices 400 in response to processor(s) 402 executing sequences of instructions contained in memory 404. Such instructions may be read into memory 404 from another computer-readable and non-transitory medium, such as data storage device 407 and/or from a remotely located server. Execution of the sequences of instructions contained in memory 404 may causes processor(s) 402 to implement the methods and functionality described above. In alternative embodiments, hard-wired circuitry may be used in place of or in combination with software instructions to implement an embodiment. Thus, the described embodiments are not limited to any specific combination of hardware circuitry and software.

The functionality and structures shown and described relative to FIGS. 1-4 enable a peer-to-peer or point-to-point transfer that allows a user to access a remote database or other data construct quickly and without necessarily downloading a full copy thereof. Device configuration and preferences may be transferred at peer-to-peer speeds, thereby enabling a user to synchronize a new or other device with an existing device more quickly than was previously possible. Significantly, faster transfer of data from one device to another device are made possible, without accessing the WAN (e.g., the Internet). Moreover, in addition of direct, point-to-point transfers of schemas from one device to another, embodiments enable transfers of permissions and/or other credentials to access, for example, a remote database from one device to another device using, for example, a point-to-point or peer-to-peer communication protocol.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method for synchronizing the contents of one device with the contents of another device, the method comprising:
   a first mobile computing device, being configured and set up, by way of configuration and setup information, to store data to and to access the data from a network-attached storage (NAS) device over a wide-area network (WAN):
      receiving a request for the configuration and setup information and for content metadata about content stored on the NAS device from a second mobile computing device, and
      transferring the configuration and setup information and the content metadata directly to the second mobile computing device; and
   the second mobile computing device:
      receiving the configuration and setup information and the content metadata directly from the first mobile computing device,
      installing the configuration and setup information received from the first mobile computing device so that the second mobile computing device is now configured and set up the same as the first mobile computing device to store data to and to access the data from the NAS device over the WAN,
      using the content metadata to request associated content from the first mobile computing device directly and/or from the NAS device over the WAN, and
      receiving the content directly from the first mobile computing device and/or from the NAS device over the WAN.

2. The method of claim 1, wherein:
   the content metadata request received by the first mobile computing device comprises a timestamp of corresponding content metadata stored in the second mobile computing device; and
   the content metadata is transferred from the first mobile computing device to the second mobile computing device only if the timestamp in the content metadata request is earlier in time than a timestamp of the content metadata at the first mobile computing device.

3. The method of claim 1, wherein:
   the content metadata request received by the first mobile computing device comprises access rights; and
   the content metadata that is transferred from the first mobile computing device to the second mobile computing device contains only that portion of the content metadata at the first mobile computing device that is compatible with the received access rights.

4. The method of claim 1, wherein the second mobile computing device uses the content metadata to request associated content from the first mobile computing device directly.

5. The method of claim 1, wherein the second mobile computing device uses the content metadata to request associated content from the NAS device over the WAN.

6. The method of claim 1, wherein the first mobile computing device transfers the configuration and setup information and content metadata to the second mobile computing device using peer-to-peer communication.

7. The method of claim 1, wherein the first mobile computing device transfers the configuration and setup information and content metadata to the second mobile computing device using peer-to-peer communication over a local area network (LAN).

8. The method of claim 1, wherein the first mobile computing device transfers the configuration and setup information and content metadata to the second mobile computing device using a short distance data transfer protocol peer-to-peer communication over a local area network (LAN).

9. A system for synchronizing the contents of one device with the contents of another device, the system comprising:
a first mobile computing device, being configured and set up, by way of configuration and setup information, to store data to and to access the data from a network-attached storage (NAS) device over a wide-area network (WAN), wherein the first mobile computing device is configured to:
receive a request for the configuration and setup information and for content metadata about content stored on the NAS device from a second mobile computing device, and
transfer the configuration and setup information and the content metadata directly to the second mobile computing device; and
the second mobile computing device configured to:
request the configuration and setup information and content metadata about content stored on the NAS device from the first mobile computing device,
receive the configuration and setup information and the content metadata directly from the first mobile computing device,
install the configuration and setup information received from the first mobile computing device so that the second mobile computing device is now configured and set up the same as the first mobile computing device to store data to and to access the data from the NAS device over the WAN,
use the content metadata to request associated content from the first mobile computing device directly and/or from the NAS device over the WAN, and
receive the content directly from the first mobile computing device and/or from the NAS device over the WAN.

10. The system of claim 9, wherein:
the second mobile computing device is further configured to:
include in the request a timestamp of content metadata stored in the second mobile computing device corresponding to the content metadata requested from the first mobile computing device; and
the first mobile computing device is further configured to:
transfer the content metadata to the second mobile computing device only if the timestamp in the content metadata request is earlier in time than a timestamp of the content metadata at the first mobile computing device.

11. The system of claim 9, wherein:
the second mobile computing device is further configured to:
include in the request access rights associated with the content metadata requested from the first mobile computing device; and
the first mobile computing device is further configured to:
transfer to the second mobile computing device only that portion of the content metadata at the first mobile computing device that is compatible with the received access rights.

12. The system of claim 9, wherein the second mobile computing device is further configured to use the content metadata to request associated content from the first mobile computing device directly.

13. The system of claim 9, wherein the second mobile computing device is further configured to use the content metadata to request associated content from the NAS device over the WAN.

14. The system of claim 9, wherein the first mobile computing device is further configured to transfer the configuration and setup information and content metadata to the second mobile computing device using peer-to-peer communication.

15. The system of claim 9, wherein the first mobile computing device is further configured to transfer the configuration and setup information and content metadata to the second mobile computing device using peer-to-peer communication over a local area network (LAN).

16. The system of claim 9, wherein the first mobile computing device is further configured to transfer the configuration and setup information and content metadata to the second mobile computing device using a short distance data transfer protocol peer-to-peer communication over a local area network (LAN).

17. A system for synchronizing the contents of one device with the contents of another device, the system comprising:
a first mobile computing device, being configured and set up by way of configuration and setup information, the first mobile computing device comprising:
means for storing data to and accessing the data from a network-attached storage (NAS) device over a wide-area network (WAN),
means for receiving a request for the configuration and setup information and for content metadata about content stored on the NAS device from a second mobile computing device, and
means for transferring the configuration and setup information and the content metadata directly to the second mobile computing device; and
the second mobile computing device comprising:
means for receiving the configuration and setup information and the content metadata directly from the first mobile computing device,
means for installing the configuration and setup information received from the first mobile computing device so that the second mobile computing device is now configured and set up the same as the first mobile computing device for storing data to and accessing the data from the NAS device over the WAN, means for using the content metadata to request associated content from the first mobile computing device directly and/or from the NAS device over the WAN, and means for receiving the content directly from the first mobile computing device and/or from the NAS device over the WAN.

18. The system of claim 17, wherein the second mobile computing device further comprises means for using the content metadata to request associated content from the first mobile computing device directly.

19. The system of claim 17, wherein the second mobile computing device further comprises means for using the content metadata to request associated content from the NAS device over the WAN.

20. The system of claim 17, wherein the first mobile computing device further comprises means for transferring the configuration and setup information and content metadata to the second mobile computing device using at least one of peer-to-peer communication over a local area network (LAN) and a short distance data transfer protocol peer-to-peer communication over a local area network (LAN).

* * * * *